Oct. 10, 1939. H. A. VAN DYKE Re. 21,232

VULCANIZING UNIT

Original Filed Jan. 9, 1936

INVENTOR.

BY HENRY A. VAN DYKE

Kwis, Hudson & Kent.

ATTORNEYS.

Reissued Oct. 10, 1939

Re. 21,232

UNITED STATES PATENT OFFICE 21,232

VULCANIZING UNIT

Henry A. Van Dyke, Philadelphia, Pa.

Original No. 2,075,486, dated March 30, 1937, Serial No. 58,431, January 9, 1936. Application for reissue February 18, 1938, Serial No. 191,275

9 Claims. (Cl. 18—18)

This invention relates to an electrical vulcanizer and particularly to an electrical vulcanizer for vulcanizing patches upon rubber articles, such as tire tubes, rubber balls, bags, and the like.

An object of the invention is to provide an electrical vulcanizer which is so constructed as to eliminate the danger of injuring the article to which a patch is being vulcanized because of excessive vulcanizing heat.

A further object is to provide an electrical vulcanizer which can be used on the road to repair tire tubes or can be employed in garages, filling stations, and the like for the same purpose.

Another object is to provide an electrical vulcanizer which is simple in construction and relatively inexpensive to manufacture, and which can be easily used for vulcanizing rubber patches upon rubber articles.

A still further object is to provide a vulcanizing unit that includes a member intended to be discarded after use, and which member is provided with an electrical heating element and carries a vulcanizing patch.

A still different object is to provide a vulcanizing unit adapted to be used with but normally separable from a suitable clamp and which unit comprises two normally and readily separable members adapted in use to be arranged in superimposed relation in the clamp, one of said members intended to be discarded after use and provided with an electrical heating element and a vulcanizing patch.

Further and additional objects and advantages not referred to above will become apparent hereinafter during the following detailed description of an embodiment of the invention.

Referring to the accompanying drawing.

Figure 1:
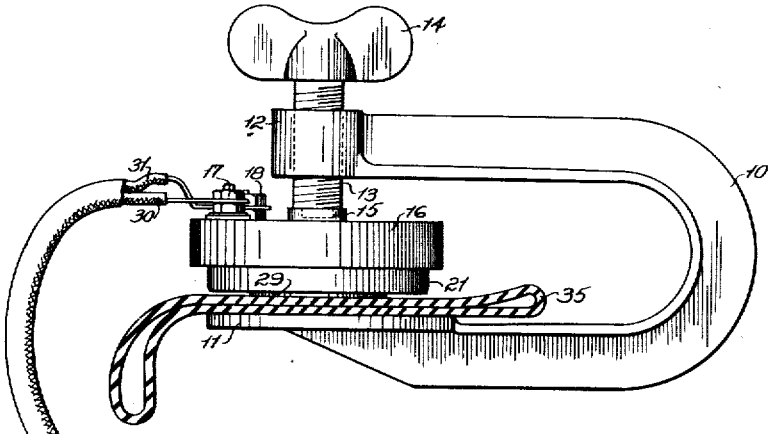
Fig. 1 is a side elevational view of the electrical vulcanizer embodying the present invention, the rubber article to which the patch is being vulcanized being shown in section.
Figure 2:
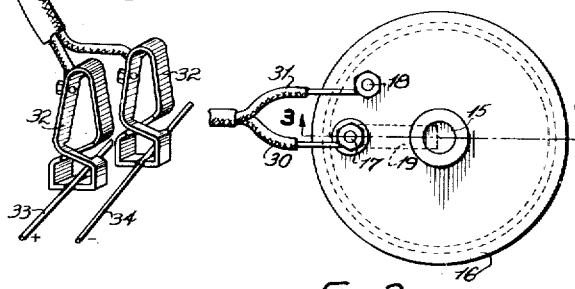
Fig. 2 is a detail top plan view of one of the members of the electrical vulcanizer.
Figure 3:
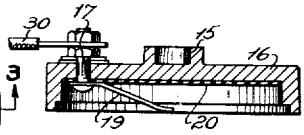
Fig. 3 is a sectional view taken substantially on line 3—3 of Fig. 2 looking in the direction of the arrows.

The electrical vulcanizer comprises a suitable C-shaped member 10, one arm of which is provided with an enlarged flat article supporting plate or table 11, while the other arm of the member 10 has at its end and above the plate 11 a boss 12 which is provided with a threaded bore in which is screwed a clamping bolt 13 carrying at its upper end a wing operating handle 14. The lower end of the clamping bolt 13 is provided with a reduced portion which engages in a recessed boss 15 on the upper side of a cup-shaped member 16 formed of suitable electrically conductive material.

The member 16 is provided with two binding posts 17 and 18 and the post 17 is insulated from the member 16 and carries on its lower end and within the cup-shaped member 16 a spring contact finger 19 of electrically conductive material, which finger terminates adjacent the central portion of the member 16. A suitable piece of electrical insulating material 20 is secured in the bottom of the cup-shaped member 16, while the binding post 18 is in electrical circuit with the member 16.

Figure 4:
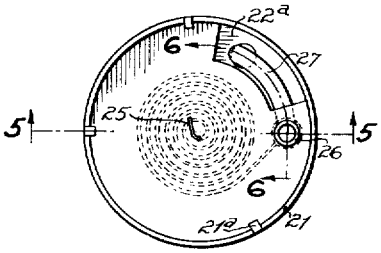
Fig. 4 is a detail top plan view of another member of the electrical vulcanizer.
Figure 5:
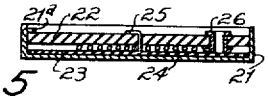
Fig. 5 is a sectional view taken substantially on line 5—5 of Fig. 4, looking in the direction of the arrows.

A vulcanizing pad 21, preferably in the form of a sheet metal cup, as clearly shown in Figs. 1, 4 and 5, is adapted to be positioned during the use of the electrical vulcanizer within the member 16. The pad 21 is provided adjacent its open end with a relatively thick insulating disk 22 and adjacent its bottom with a relatively thin insulating disk 23, it being noted that the disk 22 is provided with an elongated arcuate slot 22*a* for a purpose later to be explained.

A coiled electrical resistance element 24 is arranged between the insulating disks 22 and 23, and one end of said element extends centrally through the disk 22 and has a portion lying exteriorly of the disk, as indicated at 25 in Figs. 4 and 5, while the opposite end of the resistance element is electrically connected to a rivet 26 which is carried by the insulating disk 22.

The rivet 26 carries in electrical contact therewith a spring contact finger 27 located in the slot 22*a* of the disk 22, while the outer end of said finger overlies an opening 23*a* in the insulating disk 23, wherefore the outer end of the contact finger 27 can be brought into engagement with the bottom of the cup-shaped member 21 and soldered thereto by suitable fusible solder 28, it being noted that when the contact finger 27 is thus connected to the cup-shaped member 21 said finger is placed under spring tension.

The disks 22 and 23 and the resistance element 24 are held assembled in the cup-shaped member 21 by means of tongues 21a which are cut out of the edge of the member 21 and bent down over the outer side of the disk 22. The member 21 carries on its under side a suitable patch 29, see Fig. 1, which is to be vulcanized to the rubber article, as will be well understood.

The binding posts 17 and 18 are connected to suitable electrical conductors 30 and 31 which may be connected to suitable clamps 32 which in turn can be electrically connected with the positive and negative terminal posts of a battery as represented by the conductors 33 and 34 in Fig. 1.

When the device is employed on the road or in other places where the only source of electrical current is from a storage battery, the clamps 32 are connected to the storage battery as just described. However, when the device is employed where a suitable source of commercial curent is available, the device can be connected thereto through any suitable and well known transformer.

In operation, the article 35 to which the patch is to be vulcanized is positioned on the table 11 of the clamping member. Then the electrical vulcanizer, including the cup-shaped member 16 with the vulcanizing pad or cup-shaped member 21 positioned therein, is located over the rubber article with the patch 29 carried by the member 21 in the location where it is to be vulcanized to the article. The reduced end of the clamping screw or bolt 13 is positioned in the recessed boss 15 of the member 16 and the screw then turned down to firmly clamp the members 16 and 21 against the rubber article. The clamping of the members 16 and 21 against the rubber article brings the end 25 of the resistance element into tight electrical contact with the end of the contact finger 16, wherefore, when electrical current is applied to the binding posts 17 and 18, a complete circuit will be established through the contact finger 19, resistance element 24, contact finger 27, and the members 21 and 16. Assuming that the conductors 30 and 31 are connected to a source of electrical energy, the flow of the current through the device, as just referred to, will cause the electrical resistance element 24 to heat up to produce the necessary heat for vulcanization wherefore, since the patch 29 is held against the rubber article 35 under the pressure of the clamping screw 13, said patch will be vulcanized to the article. Inasmuch as excessive heat will have a deleterious effect upon the rubber article, it is desirable that the heat should not exceed a degree necessary to produce the desired vulcanization. The present construction is such that all danger of excessive heat being created with a consequent damage of the rubber article is eliminated during the vulcanization.

Figure 6:
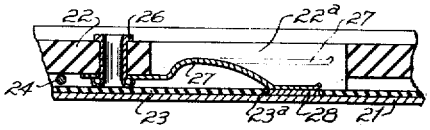
Fig. 6 is a fragmentary sectional view on an enlarged scale and is taken substantially on line 6—6 of Fig. 4, looking in the direction of the arrows.

This is accomplished by the use of the fusible solder 28 for connecting the contact finger 27 to the bottom of the cup member 21. When the heat created by the heating of the resistance element reaches a predetermined point, the solder 28 will fuse, and since the contact finger 27 has been placed under spring tension, when soldered to the member 21 said finger will immediately spring in the slot 22a from the full line position shown in Fig. 6 to the dot and dash line position shown therein, at which time the electrical circuit through the device will be broken.

From the foregoing description it will be seen that an electrical vulcanizer embodying the present invention is safe, can be used either with an electrical storage battery or with a source of commercial electrical energy, is easily assembled, and requires no particular skill in its operation.

It will also be noted that the member which carries the heating element is intended to be discarded after use, since, of course, the fusing of the solder 28 disconnects the heating element from the member, and it will be impractical to again use such member.

A vulcanizing unit of the character disclosed and described herein possesses good commercial possibilities in that in packaging and distributing the same only a single upper member 16 that constitutes the positioning means for the unit in the clamp and also the means for placing the heating element carried by the other member in an electrical circuit need be furnished in the package, together with a plurality of the heating element carrying members for use therewith and which latter members after use are intended to be discarded.

The two members of the vulcanizing unit have been described, by way of example, as made of metal, but it will be understood that they could be made of other suitable materials possessing the necessary characteristics for performing their intended functions.

Although a preferred embodiment of the invention has been illustrated and described herein, it should be understood that the invention is susceptible of various modifications and adaptations within the scope of the appended claims.

Having thus described my invention I claim:

1. A vulcanizing device adapted to be used with but readily separable from a suitable clamping means and comprising a pair of cooperating superimposed separable members, one of which is adapted to have pressure applied thereto by the clamping means and the other of which is provided with a vulcanizing patch for engagement with a rubber article, an electrical resistance element carried by one of said members which when energized creates the heat of vulcanization, and cooperating means carried by said members and coacting automatically when said members are arranged in the clamping means in superimposed relation and pressure is applied to the first named member by said clamping means to enable an electrical circuit to be completed through said resistance element.

2. A vulcanizing device comprising a pair of cooperating superimposed members, an electrical resistance element carried by one of said members and adapted to be energized to create the heat of vulcanization, one of said members being adapted to have pressure applied thereto by a suitable clamping means and the other of said members being separable from said first named member and said clamping means and adapted to carry a vulcanizing patch for engagement with a rubber article, and fusible means carried by said last named member for controlling the electrical circuit through said resistance element and which fuses at a predetermined temperature, whereby said last named member is destroyed by use and may be discarded following the vulcanization process.

3. An electrical vulcanizer adapted to be used with a suitable clamping means and comprising two interfitting separable members, one of which is adapted to be placed against the article to be vulcanized, an electrical resistance element mounted in said last named member, a spring contact finger carried by the other of said members and adapted to contact one end of said resistance element when the two members are positioned together so that an electrical circuit can be completed through said resistance element.

4. An electrical vulcanizer adapted to be used with a suitable clamping means and comprising two interfitting separable members one of which is adapted to be placed against the article to be vulcanized, an electrical resistance element mounted in said last named member, a spring contact finger carried by the other of said members and adapted to contact one end of said resistance element when the two members are positioned together, whereby an electrical circuit can be completed through said resistance element, and a spring contact finger electrically connected to the other end of said resistance element and having its end connected to the member carrying the resistance element by means of a soldered fusible connection.

5. An electrical vulcanizer adapted to be used with a suitable clamping means and comprising a cup-shaped member formed of electrically conductive material and provided with a spring contact finger located within said member and terminating centrally thereof, a second cup-shaped member formed of electrically conductive material and adapted to fit within said first member but separable therefrom, and an electrical resistance element located in said second member and having one of its ends arranged centrally thereof and adapted to contact said contact finger when said members are positioned together whereby an electrical circuit can be completed through said resistance element.

6. An electrical vulcanizer adapted to be used with a suitable clamping means and comprising a cup-shaped member formed of electrically conductive material and provided with a spring contact finger located within said member and terminating centrally thereof, a second cup-shaped member formed of electrically conductive material adapted to fit within said first member but separable therefrom, a pair of insulating disks arranged in said second member and having a resistance element located therebetween, one end of said resistance element extending through one of said disks and adapted to contact said contact finger when said members are positioned together, the opposite end of said resistance element being connected to a rivet carried by said last named insulating disk, and a spring contact finger having one end electrically connected to said rivet and said element and its opposite end electrically connected to the bottom of said second named member by means of a fusible soldered connection.

7. A vulcanizing unit adapted to be used with but normally separate from and independent of a suitable clamping means and comprising a pair of cooperating but normally and *readily* separable members, one of which is adapted to have pressure applied thereto by the clamping means and the other of which is intended to be discarded after use and is provided with a vulcanizing patch, one of said members being provided with an electrical heating element, said members in use being positioned temporarily in contact one against the other, and means for placing said heating element in an electrical circuit.

8. A vulcanizing unit comprising a pair of normally and readily separable members adapted to be used with but normally separate from and independent of a suitable clamping means, one of said members being provided with means for positioning the unit during use in said clamping means and the other of said members being provided with a vulcanizing patch and being intended to be discarded after use, one of said members being provided with an electrical heating element, said members in use being arranged in superimposed contacting relation and clamping pressure applied thereto, said members having cooperating portions for properly positioning the same with respect to each other.

9. A vulcanizing unit adapted to be used with but normally separable from and independent of a suitable clamp and comprising a relatively thin rigid electrically conductive member intended to be discarded after use and provided with an electrical heating element and suitable insulating means interposed between said element and said member, one end of said heating element being adapted to be connected with a source of electrical energy while the opposite end thereof is electrically connected to said member by a connection fusible at a relatively low temperature compared to the temperature of the fusing point of said member, said element being arranged to heat by conduction one side of said member, and a vulcanizing patch mounted directly on said side of said member.

HENRY A. VAN DYKE.

Disclaimer

Re. 21,232.—*Henry A. Van Dyke*, Philadelphia, Pa. VULCANIZING UNIT. Patent dated Oct. 10, 1939. Disclaimer filed Apr. 3, 1950, by the inventor.

Hereby enters this disclaimer to claims 7 and 8 of said patent.

[*Official Gazette May 2, 1950.*]